United States Patent [19]

Marcus

[11] Patent Number: 4,940,502

[45] Date of Patent: Jul. 10, 1990

[54] RELATING TO BONDED NON-WOVEN POLYESTER FIBER STRUCTURES

[75] Inventor: Ilan Marcus, Versoix, Switzerland

[73] Assignee: E. I. du Pont de Nemours and Company, Wilmington, Del.

[21] Appl. No.: 290,385

[22] Filed: Dec. 27, 1988

Related U.S. Application Data

[63] Continuation-in-part of Ser. No. 921,644, Oct. 21, 1986, Pat. No. 4,794,038, which is a continuation-in-part of Ser. No. 734,423, May 15, 1985, Pat. No. 4,618,531.

[51] Int. Cl.[5] .............................................. B32B 31/20

[52] U.S. Cl. .................................. 156/272.2; 156/296; 264/123; 264/126; 428/296

[58] Field of Search ..................... 156/245, 296, 272.2; 264/123, 126; 428/296

[56] References Cited

U.S. PATENT DOCUMENTS 4,663,225 5/1987 Farley et al. ........................ 264/126

*Primary Examiner*—James J. Bell

[57] ABSTRACT

A process is provided with apparatus for molding fiberballs into bonded polyester fiber structures in a continuous line system, whereby novel structures may be economically provided with advantages over bonded batts.

5 Claims, 2 Drawing Sheets

RELATING TO BONDED NON-WOVEN POLYESTER FIBER STRUCTURES

CROSS REFERENCE TO RELATED APPLICATION

This application is a continuation-in-part of my parent application Ser. No. 06/921,644, filed Oct. 21, 1986, to be issued as U.S. Pat. No. 4,794,038, Dec. 27, 1988, itself a continuation-in-part of my grandparent application Ser. No. 734,423, filed May 15, 1985, now issued as U.S. Pat. No. 4,618,531, Oct. 21, 1986.

TECHNICAL FIELD

This invention concerns improvements relating to bonded non-woven polyester fiber structures, and more particularly to a new process and apparatus providing novel bonded polyester fiber structures from fiberballs of the polyester fiber blended with binder fibers (of lower melting and softening point than the load-bearing polyester fiber), that are bonded to provide useful new through-bonded structures.

BACKGROUND OF THE INVENTION

Thermally-bonded polyester fiber batts are described in my parent U.S. Pat. No. 4,794,038 (and in many other documents, including, e.g., U.S. Pat. Nos. 4,668,562 and 4,753,693, and WO 88/00258, corresponding to Ser. No. 880,276, filed June 30, 1986), and such batts have gained large scale commercial use, particularly in Europe and Japan. Binder fibers can be intimately blended into the load-bearing polyester fiber to achieve true "through bonding" of the polyester fiber when they are suitably activated. "Through bonding" has provided higher support and better durability than resin-bonding of polyester fiber, which was the conventional method, and can also provide reduced flammability than conventional resin-bonding. Binder fiber blends are now used on a large scale to make batts in furnishing, mattresses and similar end uses where a high support and good durability are required. They have, however, seldom been used as the only filling material in these end uses, but the common practice is to use the polyester fiber batts as a "wrapping" around a foam core. It is believed that the main reason is that it has been difficult to achieve the desired properties without using the foam core. To achieve the desired resilience and durability, bonded fiber batts would have to reach high densities, in the 35 to 50 kg/m$^3$ range. Such high densities could not be achieved commercially until very recently. Even then, such condensed (i.e. high density) batts as have appeared on the market in Europe and the U.S. (e.g., in 1987) have been nonuniform in density, lower layers being denser than upper layers, which results in increased loss of height during use. These high density "block batts" (as they have been referred to) have also been characterized by relatively poor conformation to a user's body. I believe that this results from their structure, since the batts are made from a series of superposed parallel layers; when these parallelized structures are deformed under pressure, they tend to pull in the sides of the whole structure rather than to deform more locally, i.e., to conform to the shape and weight of the user's body, as would latex or good quality polyurethane foam.

Thus, hitherto, the performance of existing "block batts" made wholly from bonded polyester fiber has not been entirely satisfactory. The difficulty has been how to combine in one structure both durability and comformability to a human body. To obtain durability, with existing "block batts" from superposed carded webs, one has had to increase the density until one obtains a structure that does not conform as comfortably as other structures, i.e. not wholly from bonded polyester fiber. I have now solved this problem according to the present invention.

As will be apparent hereinafter, an essential element of the solution to this problem (i.e. of the present invention) is to use a binder fiber blend in a 3-dimensional form, as fiberballs, rather than as flat webs or as a formless mass of fibers. This may seem surprising, but the advantages will be explained, hereinafter. Preferred fiberballs (and their preparation and bonding) are the subject of my parent U.S. Pat. No. 4,794,038, referred to above, the disclosure of which is hereby incorporated by reference, it being understood, however, that other fiberballs may be used in the present invention, as indicated later herein.

SUMMARY OF THE INVENTION

According to one aspect of the invention, there is provided a continuous process for making a molded block of bonded polyester fiber having a cross-section of predetermined dimensions from a blend of polyester fiber with binder fiber, characterized in that fiberballs, consisting essentially of said blend, are formed into a shaped mass, that has a cross-section with a dimension that is larger than one of said predetermined dimensions, and that is continuously advanced through a compressing stage, in which said mass is compressed transversely, and wherein said binder fiber is activated and caused to bond the polyester fiber by first heating and then cooling the mass while said mass is maintained in compressed condition. Generally, the resulting molded block will be cut into convenient lengths, as described hereinafter, but it will be recognized that many variations are possible in this and in other respects, to take account of the versatility of the new fiberball techniques and system described herein, with addition to and/or replacement of, as appropriate, the materials and/or apparatus elements and/or conditions mentioned herein, and in my parent Patent, with particularly regard to the fiber materials that are preferred; the present application is more particularly directed towards process and apparatus aspects than to materials.

According to another aspect, there is provided an apparatus for forming a molded block of bonded polyester fiber having a cross-section of predetermined dimensions from fiberballs consisting essentially of a blend of polyester fiber and of binder fiber, comprising means for arranging the fiberballs into a shaped continuous mass having a cross-section with a dimension that is larger than one of said predetermined dimensions, means for forwarding said shaped mass through sequential compressing, heating, and cooling stages, means for compressing said mass transversely of the direction of forwarding, and means for heating and for subsequently cooling said mass while maintained in compressed condition.

New bonded fiber products result and are characterized by improved resilience, durability and conformability over the "block batts" available hitherto, as will be explained hereinafter. In essence, my new process and apparatus provides new structures that I refer to as "molded (fiberball) blocks", produced from fiberballs containing binder fiber, wherein the binder fiber has been intimately blended into the load-bearing fiber. It is often possible to detect the original ball structure from which the bonded structures have been derived and prepared, depending on the materials and conditions used. The fiberballs are conveniently laid down on a moving belt and compressed to the desired density and shape, and it is important that they be maintained in a compressed condition, e.g. between perforated members (e.g., upper and lower advancing plates or grids) and also between side walls during oven bonding and cooling, prior to any cutting. Resulting structures can be made to have high resilience, good conformability to the user's body, and good durability. Surprisingly, these structures have shown similar durability to prior art-type block batts made from the same fiber blend, but at 25% lower density than the block batts. They can be made in a large range of densities, according to the desired end-use requirements. Such continuous molding equipment may be completed, if desired by "in line" transformation of the resulting "molded fiberball blocks" into finished mattresses, cushions, or other articles. It is comparatively easy to perform further conventional steps, such as shaping, embossing, trimming, etc. . . . if desired.

This new system according to the invention provides also a speedy method of making low density products, and can be adapted to produce products of increased density, with flexibility, and over a wide dpf (denier per filament) range.

For practical reasons, it is desirable that a variety of differently-(predetermined-)dimensioned articles be obtainable from the same molding apparatus, and so I have devised means for achieving this flexibility, while ensuring that the fiberballs be maintained confined in a compressed condition in a moving "box" during the activation of the binder fiber and its solidification and/or hardening to provide the resulting bonded structure, so that it retains the desired shape and predetermined cross-sectional dimensions. These means are described in greater detail hereinafter.

DETAILED DESCRIPTION OF THE INVENTION

Figure 1:
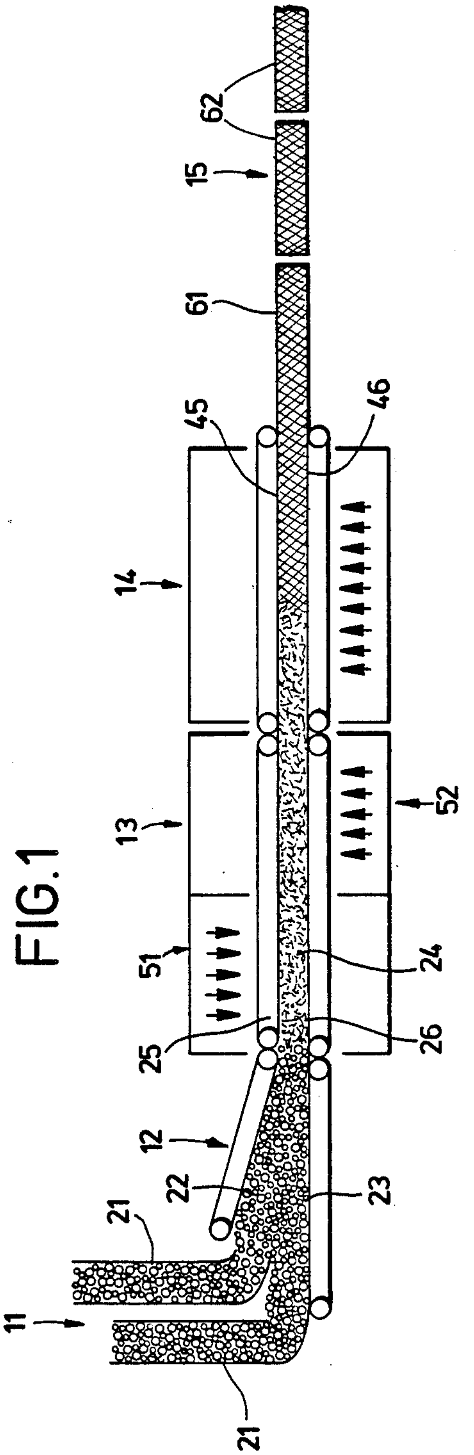
FIG. 1 illustrates in side-elevation an overall view of a preferred apparatus according to the invention to illustrate how fiberballs may be processed into a molded block and cut according to a preferred process according to the invention.

A "molded (fiberball) block" according to the invention has a completely different structure and properties than the prior "block batts"0 referred to above. In the prior "block batts", the fibers have been essentially parallelised in planes, because such batts have generally been built up by superposing several webs, and most pressures applied in use are exerted perpendicularly to the fiber length. To achieve high durability with this parallelised structure one has been forced to compress to a very high density.

High density block batts tend to become too rigid, and pull in on their sides when deformed, for example under a sitting person, rather than deform more locally and conform to the contours and weight distribution of the individual sitting thereon. In "molded (fiberball) blocks" the structure is very different. In the bonded fiberballs the fibers have strong perpendicular components and, when compressed, the bonded fiberball behaves like a small spring with a high resistance to compression. The forces which bond the fiberballs to each other are generally much weaker than the forces which resist the compression of the individual balls. This can be desirable, as it provides very high resilience on the one hand, and good local deformation in response to pressure on the other hand.

If required according to certain end-uses, it is possible to provide increased bonding strength between the fiberballs by blending the fiberballs with binder fibers prior to molding, as disclosed in my parent Application. Such binder fibers should desirably be randomly distributed between the fiberballs, before the material enters the lay down system, to provide a more rigid molded block (throughout) which does not mold itself as well to the user's body but has a higher resilience. However, as disclosed hereinafter, by appropriate adjustment and control of the materials fed to the apparatus, if desired, variation of the bonding may be achieved, e.g. across the cross-section.

The softness of the molded product of the invention generally depends on appropriate selection of the fiber denier, fiberball structure, polyester fiber/binder fiber ratio, the density of the molded product and the bonding conditions, especially the temperature. In some cases, where a high density is needed in order to reach the required durability, it may be difficult to achieve at the same time good conformation to the user's body, i.e. conformability, as the structure may become too rigid. In such cases the flexibility and the softness of the molded structure may be very substantially increased by producing the fiberballs for the molding operation from a blend of binder fibers with fibers coated with a segmented copolymer composed essentially of polyalkylene oxide and polyethylene terephtalate, as disclosed in my parent Application. The coating should be preferably cross-linked to reduce any losses of material from the coating due to the heat treatment during molding. Such hydrophilic coatings import some additional advantages to the molded product of the invention by increasing its moisture transport and improving conformation without loss of bonding strength.

The fiberballs which are suitable for the molding process according to this invention have preferably a round configuration with a certain hairiness on the surface of the balls. The optimal surface smoothness of the fiberballs may often be a compromise; a very smooth surface generally helps to distribute the balls more easily across the width of the mass, but may likely reduce the ability of the fiberballs to bond to each other. The fiberballs for the practice of this invention may be produced from a blend of binder fiber and spirally-crimped fiber, according to my parent Application, or from blends of binder fibers with mechanically-crimped fibers, it being understood that fibers may be used with both mechanical and spiral crimp, e.g. superposed on the same fiber. The fiberballs produced from the spirally-crimped fiber/binder fiber blends are generally preferred, as I have found it easier to achieve a better distribution (e.g., during the lay down process) and as they generally have a better fiberball structure, which also helps the durability of the molded block. For producing the "molded (fiberball) blocks" of the invention, both fiber components are desirably intimately blended in the original fiberballs to provide for good through bonding of the polyester fiber. The fiberballs themselves generally have a random structure, and provide a more regular or uniform density throughout the molded structure, in contrast to the tendency of condensed batts to be denser in their lower layers. In contrast with some other applications of fiberball structures, such as my grandparent U.S. Pat. No. 4,618,531, it is not generally desirable for the present invention to have such a very low cohesion. A certain hairiness is generally desirable to allow the necessary bonding between the fiberballs to achieve the required block integrity. The molding of fiberballs containing binder fiber in a discontinuous process was described in my parent Application. I have found "molded (fiberball) blocks" according to the invention have had higher resilience and better durability than "block batts" having the same average density. Without limiting the invention to any theory, one may speculate that the advantage of the fiberball molded structures may be explainable by the difference in structure of the block as discussed herein. The discontinuous fiberball molding process can be very useful for small series of production, such as furnishing cushions, which require frequent changes of the shape of the article. For mattress cores and similar articles of a larger size the discontinuous molding process is not generally so attractive economically. Mattresses in particular are flat and rectangular and generally have more or less the same length. This makes it advantageous to produce them in a continuous process. However, many problems, which do not exist in "block batts", had to be overcome before a process for a continuous molding of fiberballs could be developed.

In manufacturing of "block batts", the fibers have been opened and carded to form webs that have been cross-lapped to produce the batts. The batts have then been superposed one on top of each other, to produce the desired weight per unit area, and then compressed with rolls or belts, to reduce the height to the desired level. The condensed batts have entered an oven, where they can sometimes be compressed more, and hot air has blown through. I believe that the air pressure has maintained the integrity of such batts compressed and with the melting of the binder fibers the whole batt has lost its resilience and so it was not believed to be absolutely essential to maintain such batts compressed during the bonding process, although such equipment may have been available, and, in some cases, the block batts may have been confined to maintain their shape, especially their desired thickness, even during cooling. The "block batts" have then been cooled and cut in line. The batt integrity has been kept through the whole process because of the cohesion between the fibers within the webs and between the webs. In other words, there has been no need to guide a batt through the oven in a "box" between perforated belts or metal grids or similar protective devices, as there has been little real fear that the batt would have been blown away, e.g. at its sides, during the hot air bonding.

This same cohesion has made any compressing stage relatively simple, as the batts have been compressed in a regular way, without serious sideways shifting of the fibers.

Producing the "molded fiberball blocks" of the invention presents more complication, because the fibers are in fiberball form, which can and would move sideways when pressure is applied and would be blown away by hot air streams in the oven, unless precautions are taken, such as have not generally proved needed in practice when bonding carded batts. To solve these problems, I have invented continuous molding equipment, whereby the fiberballs are always maintained confined in three dimensions as they are constantly forwarded through during the compressing, oven-bonding, and cooling process stages.

Referring now to the assembly-line embodiment illustrated schematically in FIG. 1, a complete line may comprise, in addition to a fiberball-making unit (not shown, but which can be as disclosed in my parent Pat. No. 4,794,038, or by another ball-making technique) lay down equipment in a section indicated generally as 11 so as to form a loose, regular, 3-dimensional structure with a controlled weight per unit area and a regular thickness across its full width, a compressing section, indicated generally as 12, comprising two moving belts that are inclined towards each other as they advance the fiberballs, so as to compress the fiberballs, while they are contained between two side walls (not shown), an oven indicated generally as 13, a cooling zone indicated generally as 14, and a cutting zone, indicated generally as 15.

As indicated, the fiberballs constitute an essential element of the present invention. A preferred method of making preferred balls is described in my parent Application, the disclosure of which has been incorporated by reference. This provides information on the materials that may be used, as will be understood by those skilled in the art of bonded structures, but should be modified as described herein, and may be further modified by varying the materials and structures and conditions, as will be evident to those skilled in such arts.

The laydown section 11 may be conventional and feeds the balls (indicated generally as 21), into compressing section 12, which conveniently comprises a pair of cooperating continuous belts that advance the balls between an upper belt 22 and a lower belt 23, the lower belt conveniently providing a horizontal advancing floor to support the mass of balls as they are advanced, while the upper belt is inclined so that the mass is compressed as it is advanced towards oven 13 between sidewalls (not shown).

Figure 2:
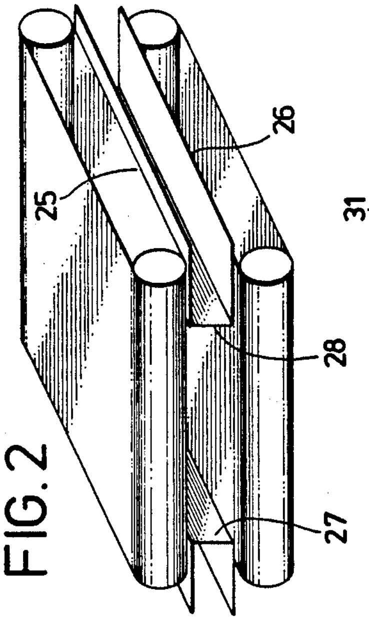
FIG. 2 is a view in perspective of a portion of the apparatus illustrated in FIG. 1, said portion being referred to as the "box" in which the fiberballs are confined while under compression during the heating and cooling stages.

The resulting compressed fiberball mass 24 is guided into the oven where it is carried along between upper and lower continuous grids or perforated plates in the form of belts 25 and 26, and two side walls, 27 and 28, all of which maintain the fiberballs in compressed condition, throughout the oven 13 and the cooling section 14, as shown also in FIG. 2.

Figure 3:
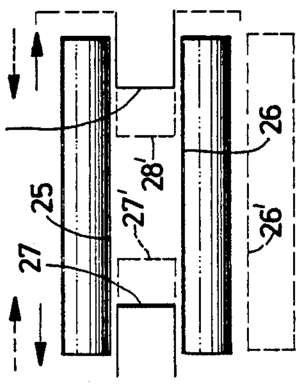

Referring now to FIG. 3, the positions of the side walls 27 and 28 may be adjusted horizontally to increase or decrease their spacing, and so, correspondingly, the width of the compressed fiberball mass therebetweeen, as shown by the dotted line positions 27' and 28'.

Figure 4:
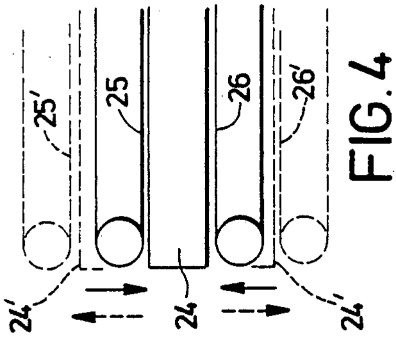
FIGS. 3 and 4 are different views in side-elevation of the same "box" to illustrate how the retaining "walls" of the "box" may be adjusted to permit variation of the desired cross-sectional dimensions of the resulting molded block.

Referring now to FIG. 4, the positions of the upper belt 25 and of the lower belt 26 may be adjusted vertically to increase or decrease their spacing, and so, correspondingly, the height of the compressed fiberball mass 24 therebetween, as shown by the dotted line positions 25' and 26' (and 26' also in FIG. 3), and also the corresponding dotted line upper and lower extents of the compressed fiberball mass 24'.

Thus, the dimensions of the cross-section of the compressed fiberball mass may be adjusted and predetermined. The positions of the plates 25 and 26 may be changed by lifting or lowering a hydraulic system to accomodate the desired product thickness. The height of the side walls may be changed as well to keep the mass completely confined and avoid fiberballs escaping or being blown away. Depending on the flexibility requirements of the equipment, the side walls may be made, e.g., from thin plates which are sliding one on top of the other, or from a lamellar structure.

As will be understood, the arrangements described and illustrated in these Figures for the oven 13 and for the cooling zone 14 are essentially similar in these respects.

Figure 5A:
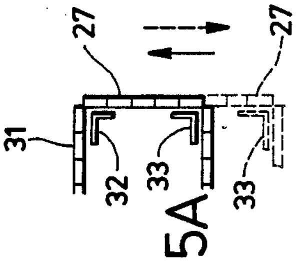
Figure 5B:
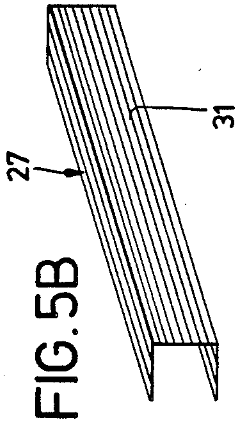

FIGS. 5A and 5B show a side wall 27 with a lamellar structure. Such side walls are made of thin lamella 31, connected by flexible wires (e.g. thin rope of Kevlar ® aramid fiber) supported on metal frames 32 and 33. The dotted line positions of the lower frame 33', and of the side wall 27'' show how the adjustment can work in practice. This system allows the production of a wide range of product thickness from very thin to very thick by changing the thickness by little steps, e.g. of 5 mm. It has the advantage of providing a smooth, clean side wall which imparts a similar clean face to the resulting molded block, without the need to cut it or correct it by contact with a hot surface.

Figure 6A:
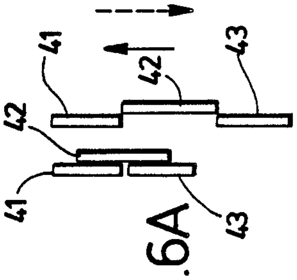
FIGS. 5A and 5B, and 6A and 6B, are views of alternative embodiments to show how the height of the side walls of the "box" maybe adjusted.
Figure 6B:
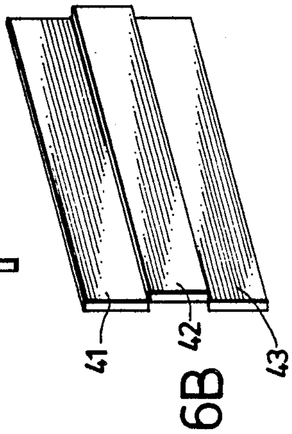

FIGS. 6A and 6B show another possibility of changing the height of the molded products of the invention. This wall is composed of several thin plates (three being shown) 41, 42 and 43 which can slide past each other to change the total height of the side wall. These plates would be supported in practice by adjustable means (not shown), such as frames at each end with locking pins or other means. As shown in FIG. 6B this system for the side wall will result, unless corrected later in the process, in slight marks or indentions on the sides of the molded block.

To modify the width of the fiberball molded blocks, one may (1) change the width of the lay down; and (2) advance or withdraw the side walls 27 and 28. To change the height, one may (1) adapt the lay down and the belt speeds; (2) adjust the gap between the upper and the lower perforated plates or grids 25 and 26; (3) adjust the height of the side walls 27 and 28 to the gap between them.

It is important to ensure that the product is maintained completely confined during both the heating and the cooling process, i.e., it is not sufficient merely to confine during the heating stage. Any stray material that may escape is conveniently removed by suction or other conventional means.

To ensure uniform bonding for the molded fiberball blocks, the hot air oven is preferably divided into two or more sections with the possibility to reverse the direction of the air flow between such sections, as shown generally in FIG. 1 at 51 and 52. To obtain a product with a consistent resilience and durability it is preferred that the temperature of the air flow is controlled within a narrow range, preferably such as ±5° C. This may be difficult to achieve with some conventional oil or gas heating due to the relatively slow response of such a system. Improved temperature control may be achieved economically by combination of an oil or gas heating system with electric heating, whereby, e.g., about 80–90% of the necessary or expected energy is generally produced by the oil or gas heating, but the electric heating (which may conveniently be located just above the perforated plates) supplies the additional calories and can quickly react to changes in temperature to maintain better temperature control. Dielectric heating means, such as by using microwaves, are expected to provide very convenient means of heating, when properly adapted.

The (fiberball-derived) structures have been found to have a much higher air permeability than block batts of the same density made from the same fiber blends. This makes it possible to achieve the desired bonding with a much shorter oven, thus reducing investment and energy consumption.

From the oven, reverting to FIG. 1, the molded block is advanced to a cooling zone 14, where it is maintained totally confined until it reaches an appropriate temperature, preferably below 50° C., so that it cannot be permanently deformed by pressures which are within the normal range of the use of the product, it being understood that the optimum conditions may depend on the particular materials selected for use. The cooling zone 14 is essentially similar to the arrangement for the oven 13, i.e. with an upper perforated grid or plate in the form of a belt 45 and a similar lower belt 46, and sidewalls (not shown in FIG. 1) but with cooling air directed as shown, or as may be convenient.

A substantial part of the energy can be recovered in the cooling zone and used to heat the air intake of the system.

From cooling zone 14, the molded mass 61, in the form of a continuing advancing column, preferably passes to a cutting zone 15, and is cut conveniently by means (not shown) to make separate blocks 62, of whatever length is desired and may be further treated as indicated, if desired.

A basic advantage of the fiberball molded blocks over the block batts is that the fiberball molded blocks can be provided to have a much more regular density, i.e. comparing top to bottom. The block batts usually show a substantial difference in density, with the bottom part having a significantly higher density. This difference is caused by the packing of the layers under the fibers' own weight due to the reduced resilience of the hot fibers. The melting of the binder fiber also contributes to their pulling down the mass of fibers as they shrink and to their sticking to the load-bearing fibers. In the case of the fiberballs, this phenomenon may be very much reduced due to their superior resistance to crushing at the practical working temperatures suitable for the fiberball structures. In the fiberball structure, there is practically no pull down by the binder fibers and the structure itself is more resistant to deformation than compressed batts of a comparable density.

The fiberball continuous molding process disclosed herein can be easily modified, if desired, to produce blocks with a profile of density, having, for instance, an increased density in the middle. This can be done conveniently by modifying the lay down system. A reinforced central section may be advantageous for some applications, particularly mattresses, to compensate for the higher pressure in this area. This may allow one to provide, in a simple process, mattress core with a reinforced middle part, whereas, previously, this was produced by cutting various foams with different densities and gluing them together.

It will also be understood that, although the process has a significant advantage in providing the capability of making bonded structures from polyester load-bearing fibers, by using binder fibers, without the need for other materials, it may in some instances, be convenient and more desirable to incorporate other materials. As indicated, in addition to the fiberballs, that are an essential structural element and predecessor material of the final molded structures, other materials may be incorporated, e.g., other fibers, such as additional binder fibers (to provide more or less bonding if desired between the ball structures), conveniently, e.g., of cut length from about 15 to about 50 mm. The fiber constituents of the balls may conveniently be of cut length up to about 100 mm, e.g., about 10 to about 100 mm, and of dpf (denier) about 2 to about 30, depending on desired aesthetics and intended use, with balls generally of dimensions (e.g., approximate diameter) up to about 20 mm (depending on aesthetics), e.g., about 2 to about 20 mm, and binder fiber desirably of melting point 50° C. or more below that of the load-bearing fiber, it being the adhesion capability below the softening point of the load-bearing fiber that is important. The characteristics of the resulting molded structures will depend on customer taste and fashion, but the densities will generally be of the order of about 20 to about 80 kg/m3 and 10 to 200 mm thick.

An interesting use of the invention and of the products is to make a molded block as an intermediate for further processing in various ways that will become apparent. For instance, the process and apparatus may be run at high speed to make low density bonded product that is sufficiently lightly bonded to be fracturable into conveniently sized particles for use as such, or themselves to be used as intermediates for further processing. Thus, by use of the process and apparatus of the invention, it is possible to provide small particles of bonded polyester by a continuous low cost operation. These particles may be used as filling material themselves, as disclosed in my parent Application, or in EP Published Application 277,494, or as insulation otherwise, or for any use that may be appropriate depending on the particular materials used and their density, size and other properties. A machine that is generally used to tear apart textile waste, such as is commercially available from the Laroche firm in France, may be used or adapted to tear apart the molded block that issues from the present invention as a continuous operation, or as separate stage, as may be desired.

Although this process and apparatus has been disclosed more particularly in relation to making molded blocks from bonded polyester fiber, because I am aware that there are already in existence many commercial operations that are involved in making products from bonded polyester fiber, it will be apparent that the apparatus and process of the invention are not limited to processing only polyester fiber, but other fibers, such as polypropylene and natural fibers and mixtures of fibers may be processed into bonded products by the same concept of the present invention, provided a suitable binder fiber is used in conjunction with such other fibers, and provided that the conditions are not such as to affect deleteriously (i.e. in an undesirable way) the fibers or the properties desired in the resulting products. Polyester, because of its properties, has proved to be especially adapted for use with existing binder fibers that have been especially designed for compatibility with polyester fiber.

I claim:

1. A continuous process for making a molded block of bonded polyester fiber having a cross-section of predetermined dimensions from fiberballs consisting essentially of a blend of polyester fiber with binder fiber, characterized in that said fiberballs are formed into a shaped mass, that has a cross-section with a dimension that is larger than one of said predetermined dimensions, and that is continuously advanced through a compressing stage, in which said mass is compressed transversely, and wherein said binder fiber is activated and caused to bond the polyester fiber by first heating and then cooling the mass while said mass is maintained in compressed condition.

2. A process according to claim 1, wherein the bonded mass is cut into separate blocks.

3. A process according to claim 1 or 2, wherein the mass is heated by passing heated air therethrough.

4. A process according to claim 3, wherein the mass is heated dielectrically.

5. A process according to claim 1 or 2, wherein the mass is heated dielectrically.

* * * * *